(12) United States Patent
Yen et al.

(10) Patent No.: US 6,502,998 B2
(45) Date of Patent: Jan. 7, 2003

(54) OPTOELECTRONIC TRANSCEIVER MODULE

(75) Inventors: Chia-Sung Yen, Taichung (TW); Nan Tsung Huang, Tu-Chen (TW); Shaoming Fu, Pan-Chiao (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/817,924

(22) Filed: Mar. 26, 2001

(65) Prior Publication Data

US 2002/0136501 A1 Sep. 26, 2002

(51) Int. Cl.[7] .................................................. G02B 6/36
(52) U.S. Cl. .............................. 385/88; 385/59; 385/24
(58) Field of Search ............................. 385/88–94, 59, 385/24; 439/92, 297; 438/138

(56) References Cited

U.S. PATENT DOCUMENTS 4,979,787 A * 12/1990 Lichtenberger ............... 385/88
5,879,173 A *  3/1999 Poplawski et al. ........ 385/92 X

* cited by examiner

*Primary Examiner*—Phan T. H. Palmer
(74) *Attorney, Agent, or Firm*—Wei Te Chung

(57) ABSTRACT

An optoelectronic transceiver module includes an assembly which includes a printed circuit board retained by and between a frame and an electrical connector. An electromagnetic shielding encloses the printed circuit board. The frame forms a receptacle for receiving an optic plug that is optically coupled to an optical subassembly mechanically and electrically connected to the circuit board.

20 Claims, 6 Drawing Sheets

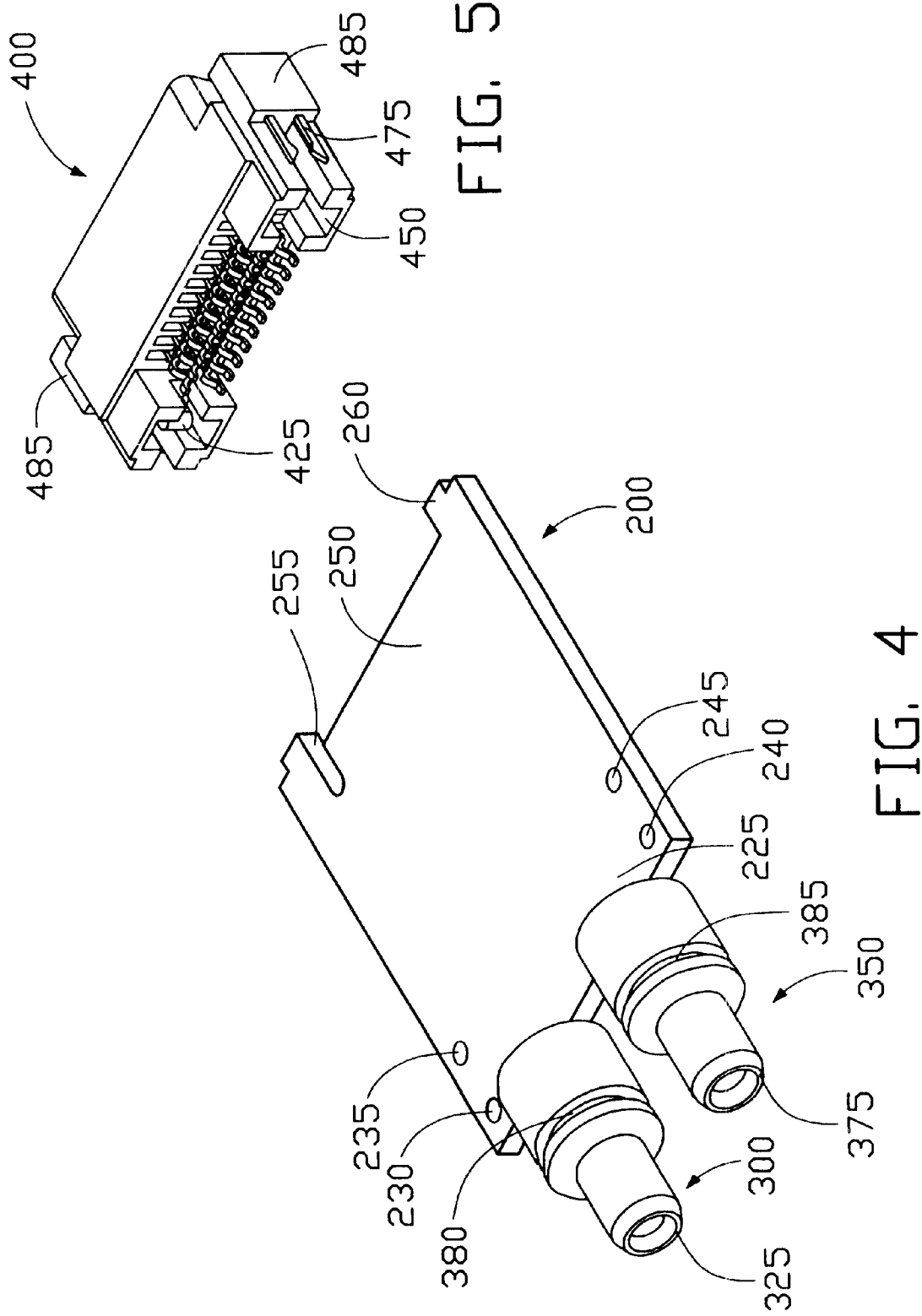

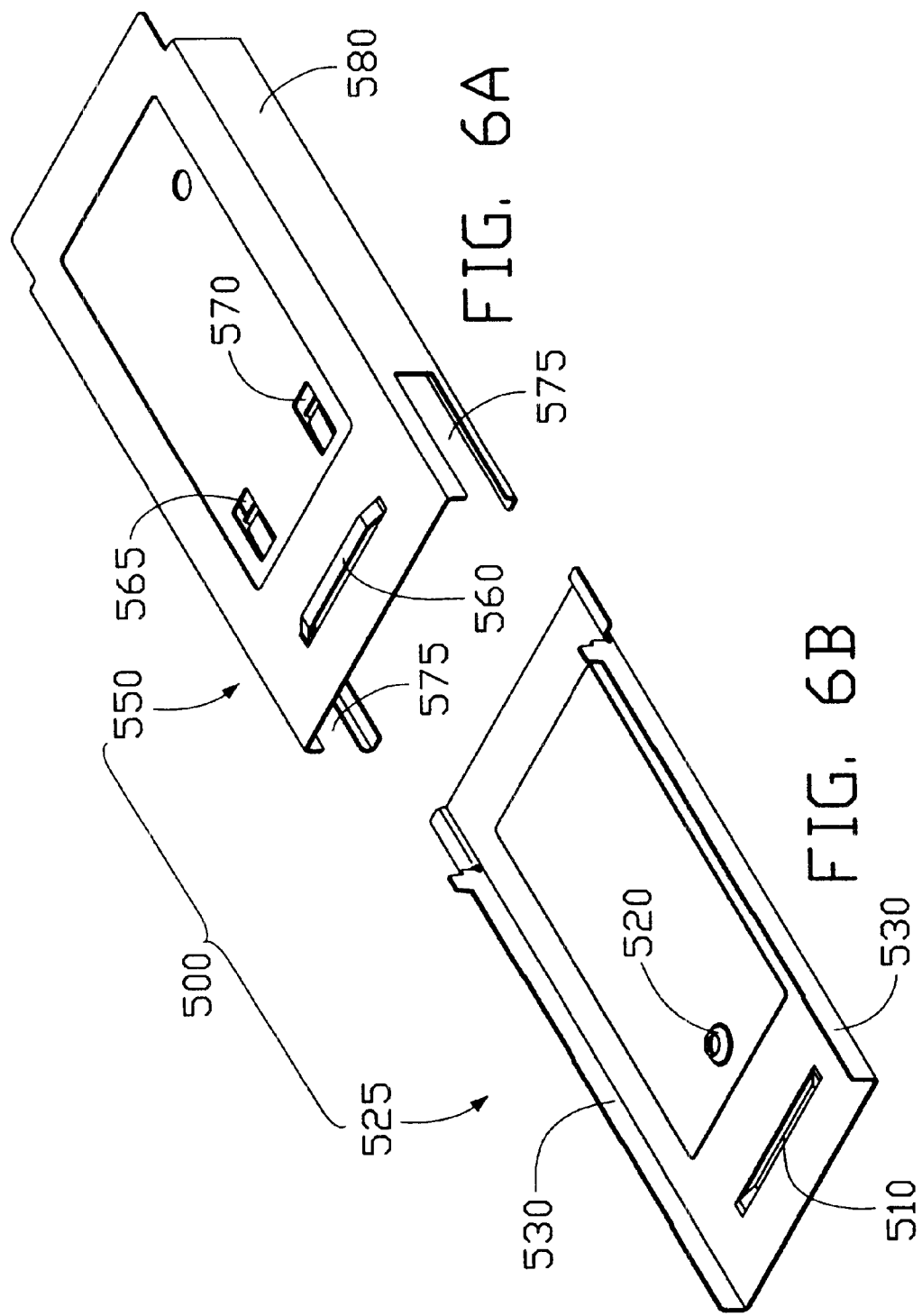

OPTOELECTRONIC TRANSCEIVER MODULE

BACKGROUND OF THE INVENTION

1. Field of the Invention

The present invention relates generally to an optoelectronic transceiver module, and particularly to an optoelectronic transceiver module having a simple structure for enhancing mass production and reducing costs. The present invention also relates to a method for manufacturing the optoelectronic transceiver module.

2. Description of Related Art

An optoelectronic transceiver module provides bi-directional transmission of data between an electrical interface and an optical data link. The module receives electrically encoded data signals which are converted into optical signals and transmitted over the optical data link. Likewise, the module receives optically encoded data signals which are converted into electrical signals and transmitted onto the electrical interface.

Normally, the transceiver is mounted on a circuit board of a host computer, an input/output system, a peripheral device, or a switch. Therefore, similar to all electronic equipments, there is a need for a transceiver having an outer package design which requires as small as possible foot print on a circuit board.

In addition, there is a need for a transceiver module of high reliability and durability. One method presently used to ensure reliability and durability is to encapsulate the electronics of the transceiver within an insulative potting material. Encapsulating the transceiver electronics helps reducing vibration sensitivity and prevents unauthorized personnel from meddling with the module electronics.

Presently, the molding of the potting material around the transceiver electronics is performed by placing the electronics within a silicone mold. Any portion of the electronics which extends outside of the mold is caulked, by hand, with a silicone compound which provides for a liquid tight seal. Once the mold is sealed, the potting material is filled therein. After the potting material is cured, the silicone mold is removed and the module formed.

The above described prior art molding process has several drawbacks. For example, it is a time consuming process and it results in a transceiver module which has a pitted outer surface. In addition, the silicone mold used in the molding process has a limited life of only three to five modules before a new mold must be employed.

U.S. Pat. No. Re. 36,820 discloses a method for making a transceiver module that has a main housing formed by means of injection molding with a polymer materials. A potting box is filled with potting material to encase the printed circuit board.

The aforementioned patent also discloses a method for assembling an optoelectronic transceiver. The transceiver comprises a printed circuit board embedded in a housing and a conductive metal coating formed on the housing. Such a method is complicated and loaded down with trivial details.

The prior art insert molding process described above has several drawbacks. For example, the structure of the optoelectronic module is complicated and the process is time consuming which cause high costs of manufacturing.

Therefore, there is a need for an optoelectronic transceiver module which has a simple structure and thus easy to manufacture.

SUMMARY OF THE INVENTION

In view of the above, it is an object of the present invention to provide an optoelectronic transceiver module package having a simple structure.

It is another object of the present invention to provide an optoelectronic transceiver module package that has a robust and tamper resistant design.

Also, it is an object of the present invention to provide an optoelectronic transceiver module comprising a printed circuit board bitten tightly by a clamp of the electrical connector.

Another object of the present invention is to provide a module package design that can easily and quickly be produced.

A further object of the present invention is to provide a module package that can be produced inexpensively.

Furthermore, it is an object of the present invention to provide an electromagnetic shielding which dissipates an electrostatic discharge and serves as a cover.

In order to achieve the objects set above, an optoelectronic transceiver module in accordance with the present invention comprising an assembly enclosed by an electromagnetic shielding is provided.

The assembly comprises a frame, a printed circuit board and an electrical connector. The frame forms a fiber optical SC duplex receptacle for receiving a fiber SC duplex plug. An optical subassembly comprising a transmitting portion and a receiving portion is mounted to a first end of the circuit board and electrically connected thereto. The first end of the circuit is attached to the frame with the optical subassembly received in the fiber optic SC duplex receptacle for engaging a duplex fiber optic plug to provide bi-directional data transmission.

Furthermore, an electrical connector is mounted to a second end of the printed circuit board. The connector comprises conductive clamps electrically engaging the circuit board for an electrostatic discharge.

Therefore, the printed circuit board is retained between and by the frame and the electrical connector. Contrary to the prior art design, the transceiver of the present invention requires no housing to enclose and support the printed circuit board. This simplifies the overall structure. The printed circuit board is surrounded by the metal electromagnetic shielding for protection and elimination of electromagnetic emissions.

Other objects, advantages and novel features of the invention will become more apparent from the following detailed description when taken in conjunction with the accompanying drawings, in which:

BRIEF DESCRIPTION OF THE DRAWINGS

FIG. 4 is a perspective view of a printed circuit board of the optoelectronic transceiver module of the present invention;

FIG. 5 is a perspective view of an electrical connector of the optoelectronic transceiver module of the present invention;

FIGS. 6A and 6B are perspective views of an electromagnetic shielding of the optoelectronic transceiver module of the present invention.

DETAILED DESCRIPTION OF PREFERRED EMBODIMENTS OF THE INVENTION

Reference will now be made to the drawings to describe the present invention in detail.

Figure 1:
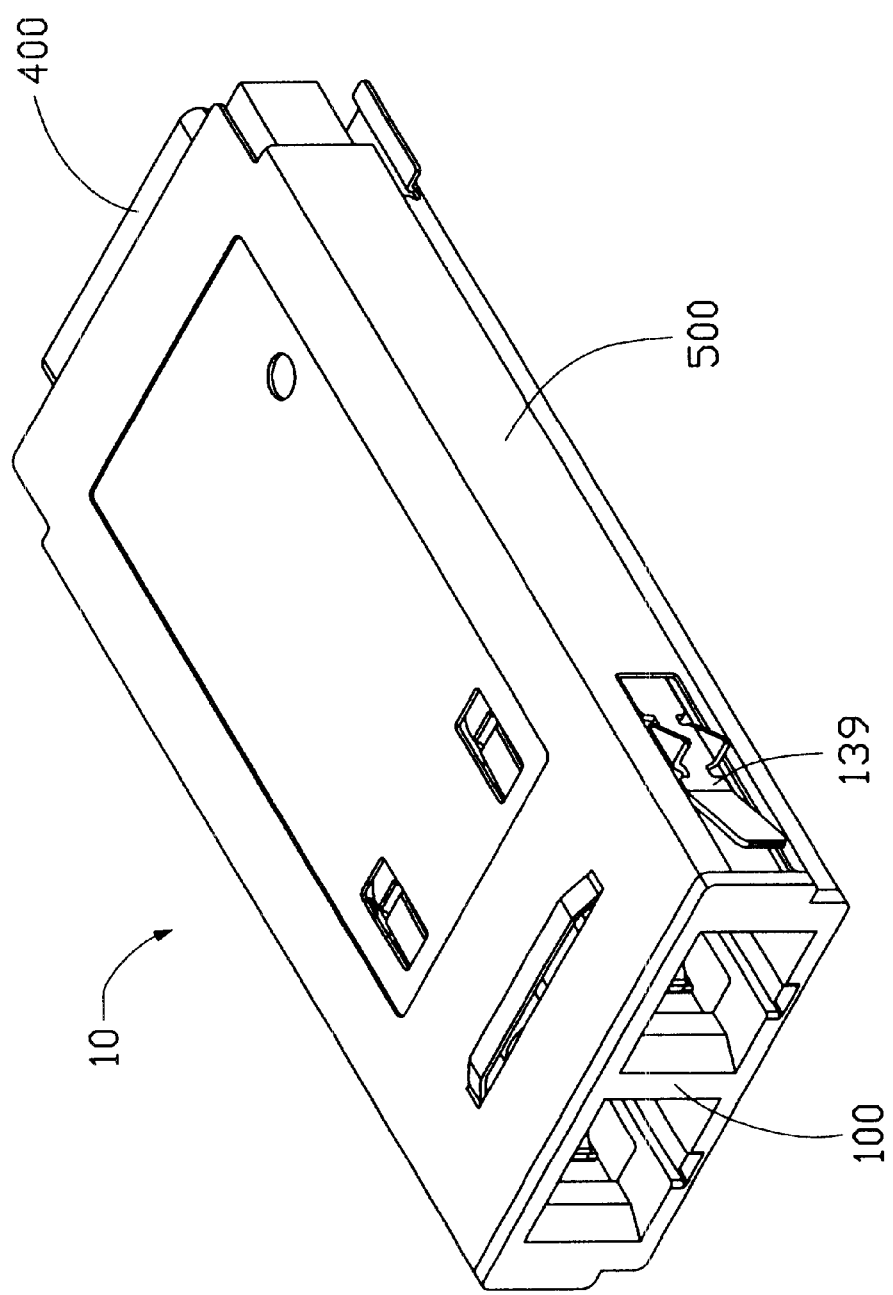
FIG. 1 is a perspective view of an optoelectronic transceiver module constructed in accordance with the present invention.
Figure 2:
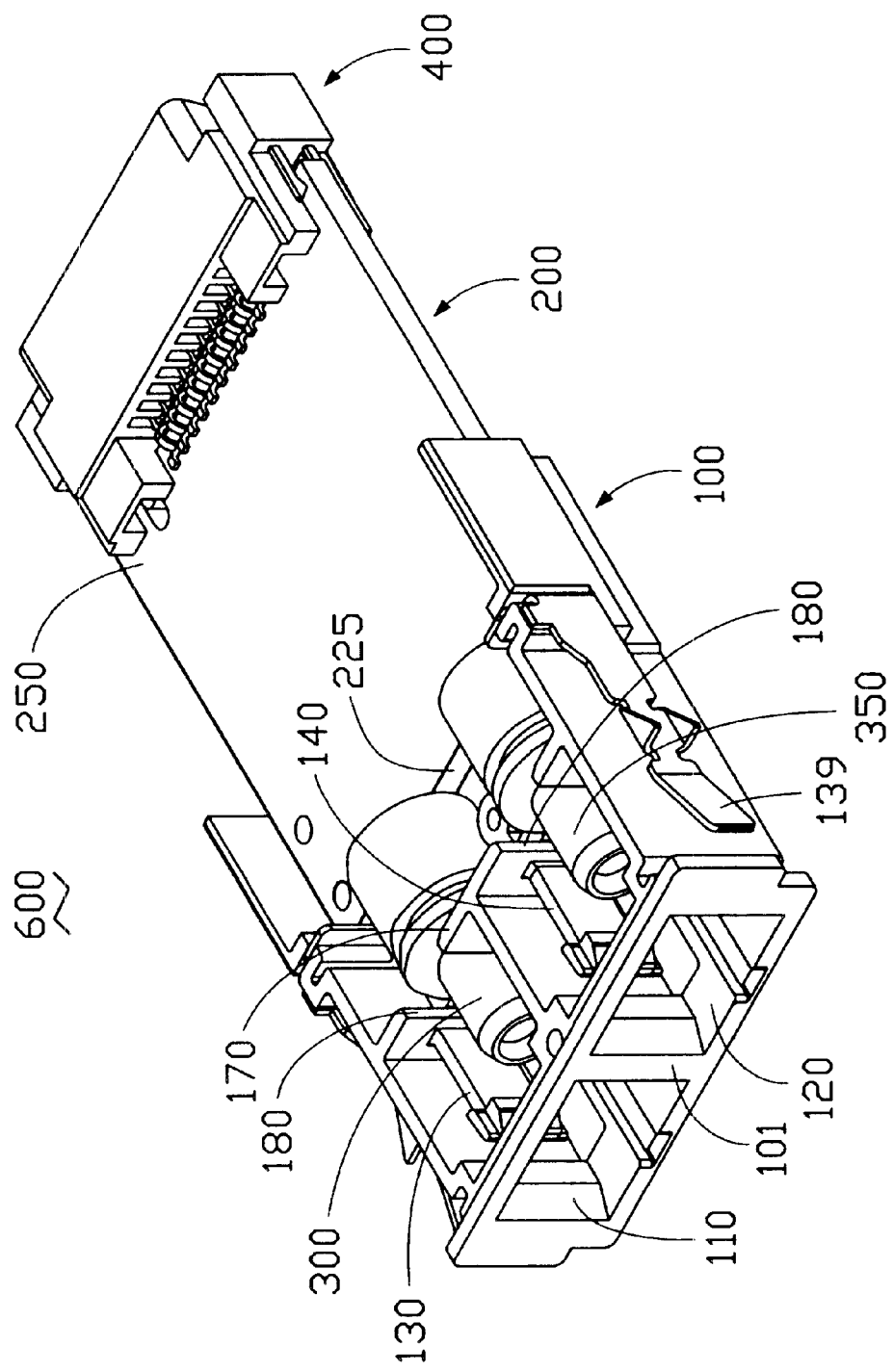
FIG. 2 is a perspective view of optoelectronic transceiver module of the present invention with a shielding removed.
Figure 7:
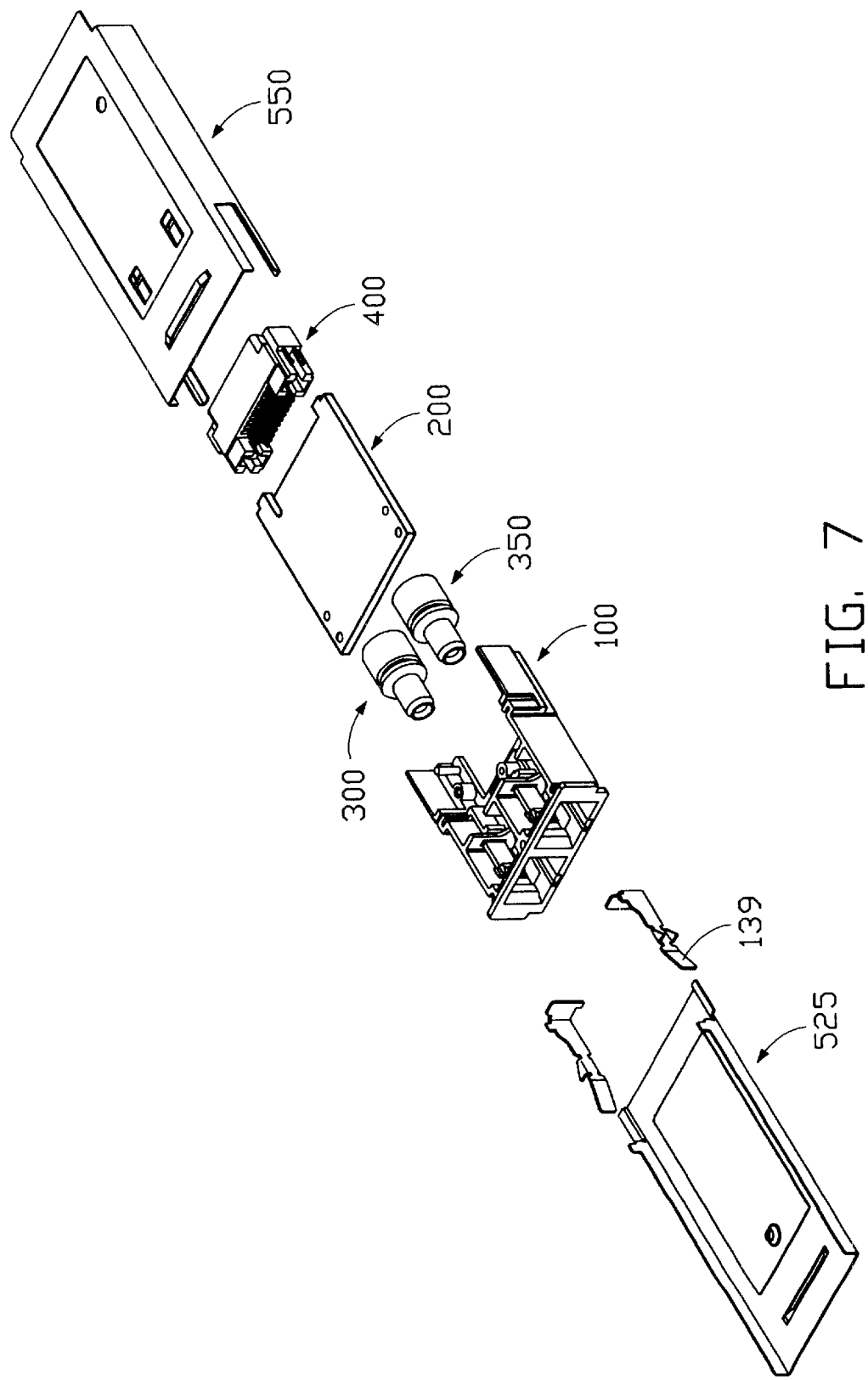
FIG. 7 is an exploded view of FIG. 1.

Referring to the drawings, and particularly to FIG. 1, an optoelectronic transceiver module 10 in accordance with the present invention is depicted. The module 10 comprises an assembly 600 as shown in FIG. 2 and an electromagnetic shielding 500 as shown in FIGS. 6A and 6B. Moreover, elementary components of the optoelectronic transceiver module 10 are shown in FIG.7.

Turning to FIG. 2, the assembly 600 comprises a frame 100 with optical subassemblies 300, 350 mounted therein, a printed circuit board 200 and an electrical connector 400. The optical subassemblies 300, 350 mechanically and electrically connects to a first end 225 of the printed circuit board 200. The electrical connector 400 is mounted to a second end 250 of the printed circuit board 200. Thus, the printed circuit board 200 is fixed between the frame 100 and the electrical connector 400.

Figure 3:
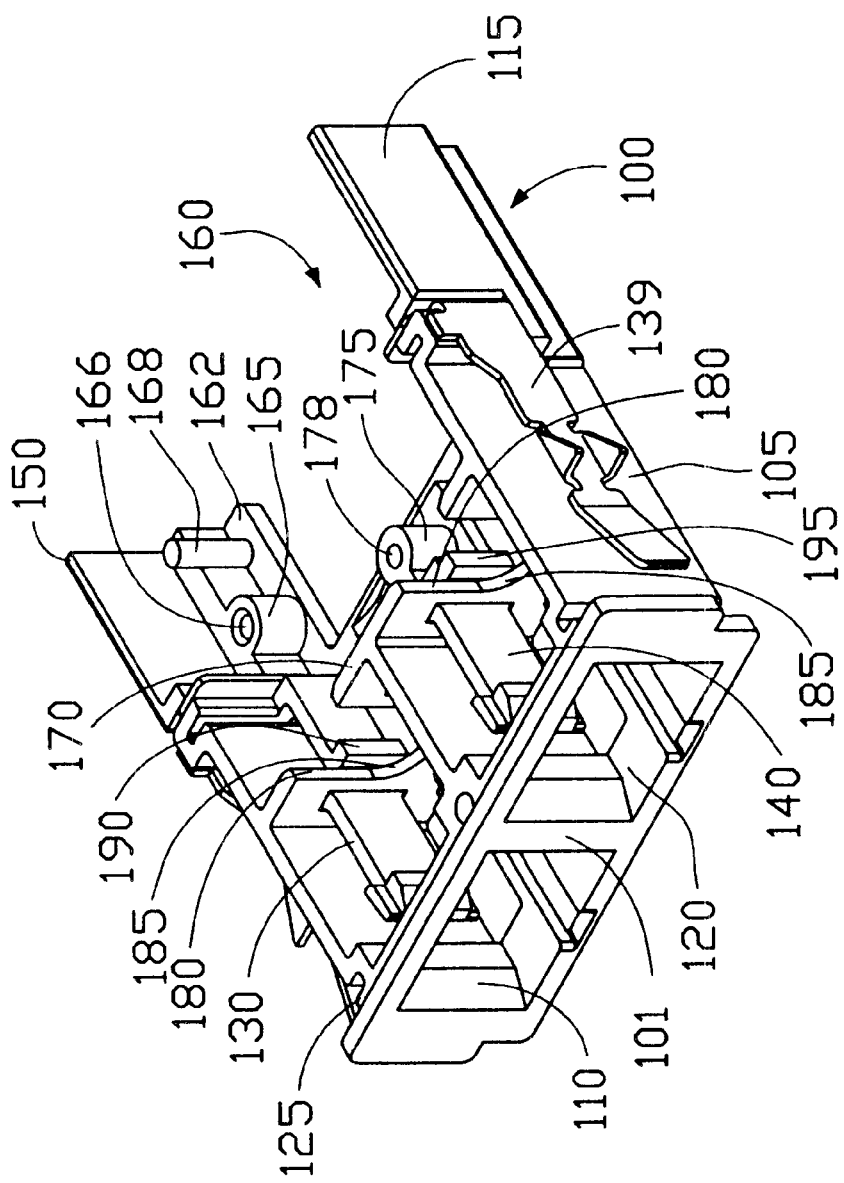
FIG. 3 is a perspective view of a frame of the optoelectronic transceiver module of the present invention.

Turning to FIG. 3, the frame 100 forms receptacles 110, 120 at a first end 125 and an opening 160 at a second end 150. The receptacles 110, 120 are separated by a partition wall 101 and are specifically dimensioned to receive a fiber optic duplex plug. For example, an SC duplex plug may be inserted in the receptacles 110, 120 whereof the receptacle 110 receives a plug for sending data and receptacle 120 receives a plug for receiving data. The opening 160 is provided for receiving the printed circuit board 200.

Turning to FIG. 4, in the embodiment illustrated, the optical subassembly 300 is for sending transmissions over a data link and the optical subassembly 350 is for receiving transmissions from a data link. In order to facilitate the connection between the transceiver module 10 and the data link, each optical subassembly 300, 350 has a ferrule receiving portion 325, 375 for receiving corresponding portions of the SC plug. The frame 100 forms a plurality of latch members 130, 140 proximate the ferrule receiving portion 325, 375.

Transmission and receipt of optically encoded data are performed by a laser diode (not shown) located within the optical subassembly 300 and a photo diode (not shown) located within the optical subassembly 350. Both the laser diode and the photo diode are electrically connected to the printed circuit board 200 mounted to the frame 100.

As depicted in FIG. 4, the printed circuit board 200 has a first end 225 and a second end 250. Incorporated onto the printed circuit board 200 is circuitry for transmitting and receiving optically encoded data (circuitry not shown). Four holes 230, 235, 240 and 245 are formed at the first end 225 for fixing the printed circuit board 200 to the frame 100. A recess 255 and a bulge 260 are formed at the second end 250 for mating with the electrical connector 400.

Turning to FIG. 5, the electrical connector 400 forms a bulge 425 and a recess 450 corresponding to and engaging the recess 255 and the bulge 260 of the printed circuit board 200 thereby attaching the printed circuit board 200 to the connector 400. The electrical connector 400 further has a pair of clamps 475 extending from side ears 485 (only one clamp being shown) for biting the printed circuit board 200 tightly and dissipating electrical discharges.

Turning back to FIG. 3, the latch members 130, 140 extend from a first wall 170 of the frame 100. The first wall 170 of the frame 100 defines recesses 180 for partially receiving the optical subassemblies 300, 350. Each recess 180 has a semi-circular lower end 185. The frame 100 forms two pairs of guide beams 190, 195 adjacent the recesses 180 for engaging a circumferential groove 380, 385 of the optical subassembly 300, 350 thereby properly positioning the optical subassemblies 300, 350 with respect to the frame 100.

Standoff columns 165 are formed in the frame 100, raised from a bottom 162 of the frame 100 for supporting the printed circuit board 200. A hole 166 is defined in each standoff column 165. portioning pins 168 are formed in the frame 100 for engaging the holes 235, 245 of the printed circuit board 200 thereby properly positioning the printed circuit board 200 with respect to the frame 100.

Referring back to FIG. 2, during the manufacture of the optical transceiver module 10, the printed circuit board 200 with the optical subassemblies 300, 350 attached thereto is placed in the frame 100 with the optical subassemblies 300, 350 extending through the recesses 180 of the first wall 170 and received in the receptacles 110, 120. The optical subassemblies 300, 350 are properly positioned within the frame 100 by the guide beams 190, 195 engaging the circumferential grooves 380, 385 of the ferrule receiving portions 325, 375.

Once positioned within the frame 100 by the positioning pins 168, the circuit board 200 is fixed by screws (not shown) extending through the holes 230, 240 of the printed circuit board and engaging holes 166 of the standoff columns 165.

Turning to FIGS. 6A and 6B, the electromagnetic shielding 500 comprises a conductive layer by metal of plating, wet plating, or vacuum metalization. The conductive layer may be an aluminum or stainless steel coating to dissipate an electrostatic discharge. Alternatively, the shielding 500 may be made of metals. The electromagnetic shielding 500 comprises a top cover 550 and a bottom cover 525. Two inner grounding structures 565, 570 and an outer grounding structure 560 are provided in the top cover 550. One outer grounding structure 510 is provided in the bottom cover 525. Turning back to FIG. 3, each sidewall 105 of the frame 100 forms a channel 115 engaging the guide flange 575 of the corresponding sidewall 580 of the top cover 550 thereby attaching the top cover 550 to the frame 100. The guide flange 575 defines a slot (not labeled) for allowing the inwardly deflectable latch 139 to extend therethrough. A hole 520 is provided on the bottom cover 525 corresponding to a post 175 formed in the frame 100. A hole 178 is defined in the post 175 for receiving a screw extending through the hole 520 of the bottom cover 525 thereby securing the bottom cover 525 to the frame 100. The bottom cover 525 further has a pair of side rims 530 to contact with side walls 105 of the frame 100.

It should be understood that in describing the top and bottom portions of the transceiver module and its respective frame components, the terms "top" and "bottom" are used by way of example only due to the orientation of the drawings. It should also be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optoelectronic module comprising:
   an assembly comprising a frame, an optical subassembly, a printed circuit board and an electrical connector; and
   an electromagnetic shielding;
   wherein the printed circuit board has two ends respectively retained by the frame and the electrical connector, the electromagnetic shielding surrounding the printed circuit board.

2. The optoelectronic module as described in claim 1, wherein the frame forms a receptacle adapted to receive a fiber optic SC duplex receptacle.

3. The optoelectronic module as described in claim 1, wherein the frame forms an opening at one end for receiving the printed circuit board.

4. The optoelectronic module as described in claim 1, wherein the optical subassembly is connected to the printed circuit board, the optical subassembly comprising a transmitting portion and a receiving portion adapted to engage a fiber optic plug assembly for bidirectional transmission of signal.

5. The optoelectronic module as described in claim 1, wherein the electromagnetic shielding is made of conductive material.

6. An optoelectronic transceiver module comprising:
   an assembly comprising:
      a frame having a first end forming a fiber optic SC duplex receptacle and a second end forming an opening, the frame defining at least one recess proximate the fiber optic SC duplex receptacle and forming positioning pins and standoff columns;
      an optical subassembly comprising a transmitting portion and a receiving portion adapted to engage a fiber optic plug assembly for bi-directional transmission of signals;
      a printed circuit board defining first holes for receiving and engaging the positioning pins and second holes for receiving fasteners engaging the standoff columns thereby securing the frame to a first end of the printed circuit board, a recess and a bulge being formed at a second end of the printed circuit board;
      an electrical connector forming a bulge and a recess respectively engaging the recess and the bulge of the printed circuit board thereby securing the connector to the second end of the printed circuit board; and
   an electromagnetic shielding enclosing the assembly;
   wherein the printed circuit board is retained by the frame at the first end and the electrical connector at the second end.

7. The optoelectronic transceiver module as described in claim 6, wherein the optical subassembly mechanically and electrically connects to the first end of the printed circuit board and is located in the fiber optic SC duplex receptacle.

8. The optoelectronic transceiver module as described in claim 6, wherein the first end of the printed circuit board and the optical subassembly are received in the opening of the frame.

9. The optoelectronic transceiver module as described in claim 6, wherein the connector forms clamps electrically engaging the printed circuit board.

10. The optoelectronic transceiver module as described in claim 9, wherein the clamps are made of metal for grounding and thus dissipating electrostatic discharges.

11. The optoelectronic transceiver module as described in claim 6, wherein the electromagnetic shielding is made of conductive material.

12. A method of assembling an optoelectronic transceiver module comprising the steps of:
   providing a circuit board having first and second ends;
   providing a frame with an optical subassembly mounted therein;
   attaching the first end of the circuit board to the frame;
   providing an electrical connector;
   mounting the electrical connector to the second end of the print circuit board, thereby fixing the circuit board between the frame and the electrical connector; and
   providing an electromagnetic shielding to surround the circuit board.

13. An optoelectronic module comprising:
   a frame receiving an optical subassembly therein;
   a pair of latches attached on two sides of the frame;
   a printed circuit board with thereof one end secured to a rearend of said frame;
   an electrical connector secured to the other end of said printed circuit board; and
   an electromagnetic shielding enclosing the frame, the printed circuit board and the connector except that said shielding defines a pair of slots on two sides thereof so as to allow the corresponding latches to extend therethrough.

14. The module as described in claim 13, wherein each of said slots is formed by a flange which engages a channel of the frame.

15. An optoelectronic module comprising:
   a frame with a first end and a second end;
   a printed circuit board with a first end and a second end, the first end of the printed circuit board partially fixed in the second end of the frame;
   an optical subassembly located in the first end of the frame and electrically connecting with the printed circuit board;
   an electrical connector electrically connecting with the printed circuit board and partially accommodating the second end of the printed circuit board; and
   an electromagnetic shielding with two parts integrating together and enclosing the printed circuit board and partially enclosing the frame and the electrical connector.

16. The optoelectronic module as described in claim 15, wherein the frame comprises pins and standoff columns at the second end thereof, the standoff columns each having a second hole defined herein.

17. The optoelectronic module as described in claim 16, wherein the printed circuit board has first holes engaging with the pins of the frame, and second holes matching with the second holes of the frame.

18. The optoelectronic module as described in claim 15, wherein the electrical connector has a bulge and a recess.

19. The optoelectronic module as described in claim 18, wherein the printed circuit board comprises a recess and a bulge at the second end thereof, which recess and bulge respectively match with the bulge and the recess of the electrical connector.

20. The optoelectronic module as described in claim 15, wherein the frame further comprises a pair of latches extending from two sides thereof.

* * * * *